United States Patent [19]

Sarkar

[11] 4,312,654
[45] Jan. 26, 1982

[54] METHOD AND APPARATUS FOR MAKING LARGE DIAMETER OPTICAL WAVEGUIDE PREFORMS

[75] Inventor: Arnab Sarkar, Big Flats, N.Y.

[73] Assignee: Corning Glass Works, Corning, N.Y.

[21] Appl. No.: 216,556

[22] Filed: Dec. 15, 1980

Related U.S. Application Data

[63] Continuation-in-part of Ser. No. 913,754, Jun. 8, 1978, abandoned.

[51] Int. Cl.$^3$ .................... C03B 37/025; C03B 37/07
[52] U.S. Cl. ........................................ 65/3.12; 65/18.2;
 65/32; 65/271; 65/272; 118/725; 427/163;
 427/237
[58] Field of Search ................. 65/3.12, 18.2, 32, 144,
 65/271, 272; 427/163, 166, 167, 181, 237;
 118/724, 725

[56] References Cited

U.S. PATENT DOCUMENTS

| 3,654,895 | 4/1972 | Bloom et al. | 118/725 |
| 3,980,459 | 9/1976 | Li | 65/3 A X |
| 3,982,916 | 9/1976 | Miller | 65/3 A |
| 4,090,055 | 5/1978 | King | 65/3 A |
| 4,117,802 | 10/1978 | Le Sergent et al. | 118/725 |

FOREIGN PATENT DOCUMENTS

| 857984 | 2/1978 | Belgium . |
| 2420476 | 6/1975 | Fed. Rep. of Germany . |
| 2712993 | 6/1977 | Fed. Rep. of Germany . |
| 2642949 | 3/1978 | Fed. Rep. of Germany . |
| 2266668 | 10/1975 | France . |

OTHER PUBLICATIONS

Gambling et al, "Optical Fibers Based on Phosphosilicate Glass"; Proceedings of the IEE; vol. 123, No. 6; Jun. 1976; pp. 570-576.

Simpkins et al, "Thermophoresis: The Mass Transfer Mechanism. . . "; J. Appl. Phys., 50 (9); Sep. 1979; pp. 5676-5681.

Walker et al, "Thermophoretic Deposition of Small Particles . . . "; Journal of Colloid and Interface Science, 69 (1); Mar. 15, 1979; pp. 138-147.

*Primary Examiner*—Richard V. Fisher
*Attorney, Agent, or Firm*—William J. Simmons, Jr.

[57] ABSTRACT

A glass optical waveguide filament preform is prepared by chemical reaction of vapor ingredients within a glass bait tube. As the reactants flow through the bait tube, a hot zone traverses the tube to cause the deposition of sooty reaction products in the region immediately downstream of the hot zone. A baffle tube extends into that end of the bait tube into which the reactants flow. The baffle tube, which traverses the bait tube along with the burner, ends just short of the hot zone so that no soot is deposited thereon. A gas flowing from the baffle tube creates a gaseous mandrel which confines the flow of reactant vapors to an annular channel adjacent the bait tube wall in the hot zone, thereby increasing deposition rate and efficiency.

17 Claims, 6 Drawing Figures

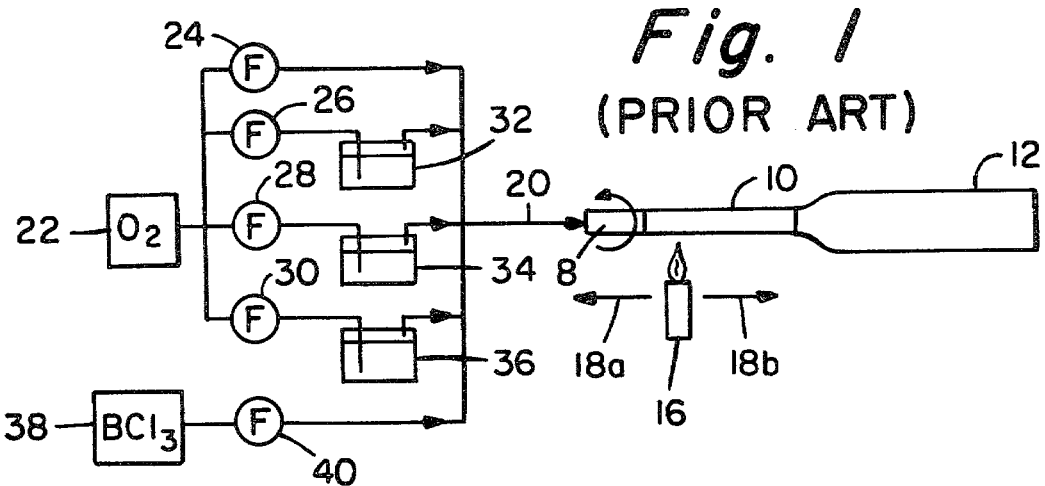
Fig. 1 (PRIOR ART)
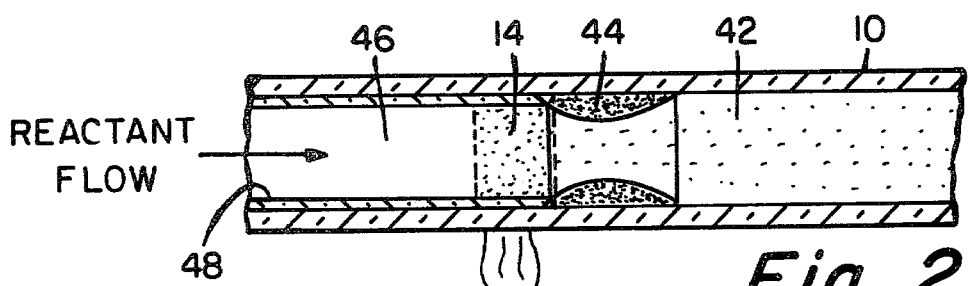
Fig. 2 (PRIOR ART)
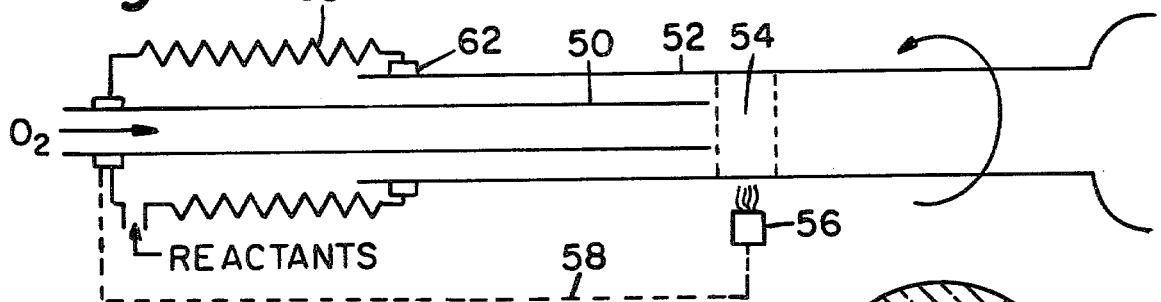
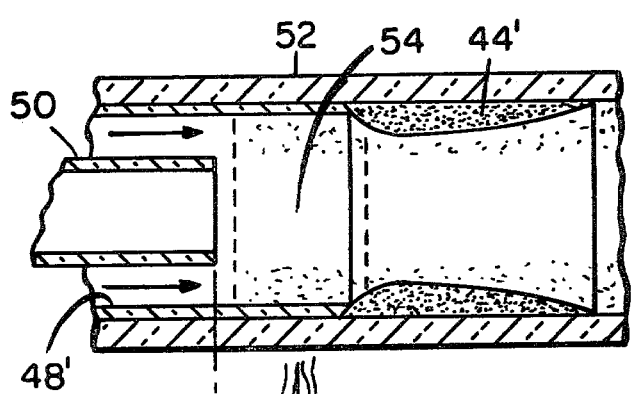
Fig. 4
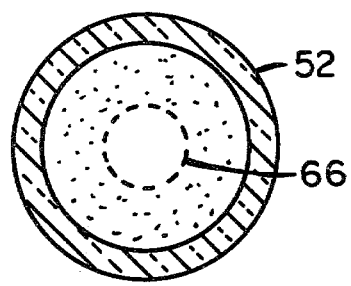
Fig. 5
Fig. 6

METHOD AND APPARATUS FOR MAKING LARGE DIAMETER OPTICAL WAVEGUIDE PREFORMS

CROSS-REFERENCE TO RELATED APPLICATION

This is a continuation-in-part application of U.S. patent application Ser. No. 913,754 filed June 8, 1978, now abandoned.

BACKGROUND OF THE INVENTION

The present invention relates to optical waveguide filaments, and more particularly to an improved method of forming blanks from which such filaments are drawn.

Optical waveguides, which are the most promising medium for use in optical communication systems operating in the visible or near visible spectra, normally consist of an optical filament having a transparent core surrounded by a transparent cladding material having a refractive index lower than that of the core.

The stringent optical requirements placed on the transmission medium to be employed in optical communications systems has negated the use of conventional glass fiber optics, since attenuation therein due to both scattering and impurity absorption is much too high. Thus, unique methods had to be developed for preparing very high purity glasses in filamentary form. Certain glass making processes, particularly vapor deposition processes, have been commonly employed in the formation of optical waveguide blanks. In one such process, the source material vapor is directed into a heated tube wherein it reacts to form a material which is deposited in successive layers. The combination of deposited glass and tube is collapsed to form a draw blank which can be later heated and drawn into an optical waveguide filament.

In order to obtain uniform deposition along the length of the substrate tube, a serial deposition process has been employed. That is, reactants are fed into the end of the tube, but deposition occurs only in a narrow section of the tube which is heated by a flame. The flame moves up and down the tube to move the reaction and thus the region of glass deposition serially along the tube.

One of the limitations of such a process is a comparatively low effective mass deposition rate. To increase the deposition rate it appears to be necessary to increase the inside diameter of the substrate tube to provide a greater collection surface area. However, since heat is supplied from the outside of the tube, a larger tube diameter results in a lower vapor temperature at the axis of the tube. Moreover, the flow profile across the tube is such that maximum flow occurs axially within the tube. As tube diameter increases, a smaller portion of the reactant vapor flows in that region of the tube adjacent the wall where reaction temperature is higher and where the resultant sooty reaction products are more readily collected on the heated region of the tube.

It is therefore an object of the present invention to improve the deposition efficiency of a process whereby a reactant vapor flows into and reacts within a heated tube to form a layer therein.

SUMMARY OF THE INVENTION

Briefly, the present invention relates to a method and apparatus for manufacturing a preform which is intended to be subsequently drawn into an optical filament. This method is of the type that includes the steps of flowing a vapor mixture including at least one compound, glass-forming precursor, together with an oxidizing medium, through a hollow, cylindrical substrate, and heating the substrate and contained vapor mixture with a heat source that moves relative to the substrate in a longitudinal direction, whereby a moving hot zone is established within the substrate, such that a suspension of particulate, oxidic reaction product material is produced within the hot zone. The particulate material travels downstream where at least a portion thereof comes to rest on the inner surface of the substrate where it is fused to form a continuous glassy deposit. The improvement of the present invention comprises confining the flow of the vapor mixture to an annular channel adjacent the substrate surface in the hot zone whereby the deposition efficiency of the vapor mixture reaction is increased.

In accordance with a preferred embodiment of the present invention, a gas conducting baffle tube is disposed in one end of the cylindrical substrate, one end of the baffle tube terminating adjacent the hot zone. Means is provided for moving the tube longitudinally with respect to the substrate in synchronism with the movement of the heating means which generates the moving hot zone. Gas emanating from the baffle tube forms a gaseous mandrel in the hot zone which confines the vapor mixture to an annular channel adjacent the substrate surface.

BRIEF DESCRIPTION OF THE DRAWINGS

FIG. 1 is a schematic representation of a prior art apparatus for depositing a glass layer within a tube.

FIG. 2 shows a section of the tube of FIG. 1 depicting observed conditions during processing.

FIG. 3 is a schematic representation of an apparatus suitable for practice of the deposition process in accordance with the present invention.

FIGS. 4 and 5 are cross-sectional views of the apparatus of the present invention depicting conditions occurring during processing.

FIG. 6 shows the end of a modified baffle tube that can be employed in the apparatus of the present invention.

DESCRIPTION OF THE PREFERRED EMBODIMENT

FIGS. 1 and 2 show a prior art system comprising a substrate tube 10 having handle tube 8 affixed to the upstream end thereof and exhaust tube 12 affixed to the downstream end thereof. Tubes 8 and 12 are chucked in a conventional glass turning lathe (not shown), and the combination is rotated as indicated by the arrow. The handle tube, which may be omitted, is an inexpensive glass tube having the same diameter as the substrate tube, and it does not form a part of the resultant optical waveguide. A hot zone 14 is caused to traverse tube 10 by moving heating means 16 as schematically depicted by arrows 18a and 18b. Heating means 16 can consist of any suitable source of heat such as a plurality of burners encircling tube 10. Reactants are introduced into tube 10 via inlet tube 20, which is connected to a plurality of sources of gases and vapors. In FIG. 1, flow meters are represented by a circle having the letter "F" therein. A source 22 of oxygen is connected by flow meter 24 to inlet tube 20 and by flow meters 26, 28 and 30 to reservoirs 32, 34 and 36, respectively. A source 38 of boron trichloride is connected to tube 20 by a flow meter 40. Reservoirs 32, 34 and 36 contain normally liquid reactant materials which are introduced into tube 10 by bubbling oxygen or other suitable carrier gas therethrough. Exiting material is exhausted through exhaust tube 12. Not shown is an arrangement of mixing valves and shutoff valves which may be utilized to meter flows and to make other necessary adjustments in composition.

Burner 16 initially moves at a low rate of speed relative to tube 10 in the direction of arrow 18b, the same direction as the reactant flow. The reactants react in hot zone 14 to produce soot, i.e., a powdery suspension of particulate oxidic material, which is carried downstream to region 42 of tube 10 by moving gas. In general, between twenty and seventy percent of reaction product produced in that portion of the vapor stream results in the deposition of soot on the substrate surface.

It is noted that essentially no soot is formed in region 46 of tube 10 upstream from hot zone 14. As burner 16 continues to move in the direction of arrow 18b, hot zone 14 moves downstream so that a part of sood buildup 44 extends into the hot zone and is consolidated thereby to form a unitary, homogeneous glassy layer 48. Such process parameters as temperatures, flow rates, reactants and the like are discussed in the publications J. B. MacChesney et al., Proceedings of the IEEE, 1280 (1974) and W. G. French et al., Applied Optics, 15 (1976). Reference is also made to the text *Vapor Deposition* Edited by C. F. Powell et al. John Wiley and Sons, Inc. (1966).

When burner 16 reaches the end of tube 10 adjacent to exhaust tube 12, the temperature of the flame is reduced and the burner returns in the direction of arrow 18a to the input end of tube 10. Thereafter, additional layers of glassy material are deposited within tube 10 in the manner described above. After suitable layers have been deposited to serve as the cladding and/or core material of the resultant optical waveguide filament, the temperature of the glass is increased to about 2200° C. for high silica content glass to cause tube 10 to collapse. This can be accomplished by reducing the rate of traverse of the hot zone. The resultant draw blank is then drawn in accordance with well-known techniques to form an optical waveguide filament having the desired diameter.

To optimize the process from the standpoint of reaction, high temperatures are utilized. For the usual silica based system, temperatures at the substrate wall are generally maintained between about 1400° and 1900° C. at the moving position corresponding with the hot zone. Indicated temperatures are those measured by a radiation pyrometer focused at the outer tube surface.

It is commonly known that one of the factors which limits deposition rate is the rate of sintering deposited soot to form a transparent glass layer. For a given composition of glass to be deposited, there is a maximum layer thickness of glass that can be sintered using the optimum combination of hot zone width, peak temperature of the hot zone and burner traverse rate. If the thickness of the sintered glass layer can be kept to the maximum value for different tube diameters, deposition rate increases proportionately with tube inside diameter because of increased surface area. However, because of the nature of flow dynamics of the reactant vapor stream and soot particle dynamics, the percentage of soot produced which deposits in the substrate tube decreases with increased tube diameter, thereby causing an effective decrease of deposition rate.

In accordance with the present invention means is provided for confining the flow of reactants to an annular channel adjacent the wall of the substrate tube in the hot zone. As shown in FIG. 3 a portion of gas conducting tube 50 extends into that end of substrate or bait tube 52 into which the reactants are introduced. That portion of tube 50 within tube 52 terminates just prior to the hot zone 54 created by moving heat source 56. Tube 50 is mechanically coupled by means represented by dashed line 58 to burner 56 to ensure that tube 50 is maintained the proper distance upstream of the hot zone 54. Alternatively, the heat source and gas feed tube may be kept stationary, and the rotating substrate tube may be traversed. The input end of tube 52 is connected to tube 50 by a collapsible member 60, a rotating seal 62 being disposed between member 60 and tube 52. As shown in FIG. 4, which is a cross-sectional view of the hot zone and adjacent regions of tube 52, gas emanating from tube 50 provides an effective mandrel or barrier to the reactants flowing in the direction of the arrows between tubes 50 and 52, thereby confining those reactants to an annular channel adjacent the wall of tube 52 in hot zone 54. For some distance downstream from hot zone 54, gas from tube 50 continues to act as a barrier to soot formed in the hot zone, thereby enhancing the probability that such soot will deposit on the wall of tube 52 as shown at 44'. Dashed line 66 of FIG. 5 represents the boundary between the gas emanating from tube 50 and the reactant vapor flowing in the hot zone 54.

The gas supplied to the hot zone by tube 50 may be any gas that does not detrimentally affect the resultant optical waveguide preform. Oxygen is preferred since it meets this requirement and is relatively inexpensive. Other gases such as argon, helium, nitrogen and the like may also be employed.

As shown in FIG. 4, the end of tube 50 is separated from the center of the hot zone by a distance x which must be great enough to prevent the deposition of soot on tube 50. The distance x will vary depending upon such parameters as the width of the burner and the temperature of the hot zone. The following findings were made for a deposition system wherein the outer diameters of tubes 50 and 52 were 20 and 38 mm, respectively, and the wall thicknesses thereof were 1.6 and 2 mm, respectively. The burner face orifices were located within a 45 mm diameter circle. In this system it was found that soot will deposit on tube 50 if the distance x is about 13 mm. Mixing of the reactant vapor stream with the gas flow through the baffle tube increases with the longitudinal distance from the baffle tube. The advantage derived by restricting reactant vapor to an annular region close to the wall of tube 52 may be obtained with a distance x up to about 15 cm. Best results are obtained when the distance x is within the range of 25-75 mm.

The size and shape of tube 50 should be such that a substantially laminar flow exists in the hot zone and in the region immediately downstream therefrom. Any turbulence which is introduced by tube 50 tends to pick up soot particles and carry them downstream to the exhaust tube.

In the prior art deposition process described in conjunction with FIGS. 1 and 2, deposition efficiency falls with an increase in tube diameter. An increase in deposition rate with increased tube diameter can be obtained by increasing tube diameter to about 30 mm. For tubes having diameters greater than 30 mm, deposition efficiency falls at a faster rate so that further increase in deposition rate is difficult to obtain. However, with the use of a baffle tube, the reactant vapor stream is restricted to a fixed distance from the inside surface of the bait tube that produces optimum deposition efficiency irrespective of bait tube diameter. The maximum size of the outer tube is limited by such considerations as that size tube for which the inner hole can be closed to form an optical waveguide preform. The wall thicknesses of the bait tube and the baffle tube are usually maintained relatively small, i.e., a few millimeters in thickness.

A cylindrically shaped baffle tube such as that illustrated in FIGS. 3 and 4 has been found to be easily constructed and to function satisfactorily to supply a mandrel of gas to the hot region of the bait tube without introducing an undue amount of turbulence. Other shapes such as that shown in FIG. 6 could also be employed to perform this function. The direction of gas flow from tube 70 is shown by arrow 72.

To illustrate the improvement in deposition rate and efficiency, a deposition system was operated both with and without a baffle tube 50 therein, all other process parameters remaining unchanged. Apparatus similar to that shown in FIG. 1 was employed to supply the reactant stream; however, only one reservoir 32 was employed. Oxygen was flowed through reservoir or bubbler 32 containing $SiCl_4$ maintained at 35° C. to provide a flow of about 2.5 g/m $SiCl_4$. The flow rate of the $BCl_3$ was 92 sccm, and the flow of oxygen through flow meter 24 was 2.4 slm. The bait tube was a borosilicate glass tube having an outer diameter of 38 mm and a 2 mm wall thickness. A borosilicate glass having a composition of about 14 wt.% $B_2O_3$ and 86 wt.% $SiO_2$ was deposited. From the flow rates of $SiCl_4$ and $BCl_3$, the rate of oxide production was calculated to be 0.85 g/min $SiO_2$ and 0.29 g/min $B_2O_3$. The deposition rate was 0.251 g/min and the deposition efficiency was 26.2% when no baffle tube was employed. The system was then modified by adding a fused silica baffle tube having an outside diameter of 20 mm and a wall thickness of 1.6 mm. The end of the baffle tube was separated from the center of the hot zone by a distance of 50 mm. By employing the baffle tube, the deposition rate increased from 0.251 to 0.451 g/min and the efficiency increased from 26.2 to 43.2%.

Table I illustrates the effect of changing various of the process parameters on deposition rate and efficiency.

TABLE I

| Example | Oxide Production (g/min) | | $O_2$ Flow (slm) | | Layer Thickness (mm) | Deposition | |
|---|---|---|---|---|---|---|---|
| | $SiO_2$ | $B_2O_3$ | By-pass | Baffle | | Rate (g/min.) | Efficiency Percent |
| 1 | 0.885 | 0.143 | 2.4 | 1.8 | 0.0196 | 0.461 | 44.1 |
| 2 | 1.48 | 0.234 | 2.4 | 1.8 | 0.0252 | 0.595 | 34.7 |
| 3 | 1.48 | 0.234 | 2.4 | 2.9 | 0.0231 | 0.545 | 31.8 |
| 4 | 1.48 | 0.234 | 2.4 | 1.05 | 0.0236 | 0.557 | 32.5 |
| 5 | 1.48 | 0.234 | 2.4 | 2.5 | 0.0300 | 0.691 | 40.3 |
| 6 | 1.48 | 0.234 | 2.0 | 2.2 | 0.0265 | 0.610 | 35.6 |

In Examples 1 through 6 of this Table the bait tubes consisted of 38 mm OD borosilicate tubes having a 2 mm wall thickness and the baffle tubes consisted of 20 mm OD fused silica tubes having a 1.6 mm wall thickness. In the course of these experiments, a plurality of layers of glass were deposited within the bait tube in the manner described above. After 10 to 30 layers were deposited, the bait tubes were broken, and the thickness of each of the layers was measured under a microscope. The deposition rate was calculated from the layer thickness, and the deposition efficiency was defined as the deposition rate in g/min divided by the total mass flow of soot entering the tube, assuming a 100% conversion to oxides. The best results obtained were a deposition rate of 0.691 g/min, at 40.3% efficiency.

Based on the experiments reported above, it is obvious that improved deposition rates and deposition efficiencies can be realized during the manufacture of optical waveguide preforms. The following theoretical example is illustrative of the manner in which the apparatus of the present invention could be employed to manufacture such a perform.

A tube of commercial grade borosilicate glass having a 38 mm outside diameter and a 2 mm wall thickness is cleaned by sequential immersion in hydrofluoric acid, deionized water and alcohol. This bait tube, which is about 120 cm long, is attached to a 90 cm length of exhaust tube having a 65 mm outside diameter on one end and a 60 cm handle tube of the same size as the bait tube on the other end. This combination is inserted into a lathe such that the tubes are rotatably supported. The free end of the handle tube is provided with a rotatable seal through which a 180 cm long section of fused silica baffle tube having a 20 mm outside diameter and a 1.6 mm wall thickness is inserted. The baffle tube is supported at two different points along its length on a support which moves along with the burner. The burner traverses a 100 cm length of the bait tube at a rate of 25 cm/min. The burner is adjusted to provide a deposition temperature of 1800° C. at the outer surface of the bait tube. After the burner reaches the end of its traverse during which a layer of glass is deposited, it returns to its starting point at a rate of 100 cm/min.

Oxygen flows into the baffle tube at the rate of 2.5 slm. Three reservoirs are provided containing $SiCl_4$, $GeCl_4$ and $POCl_3$, respectively, these reservoirs being maintained at a temperature of 32° C. Oxygen flows through the first and third reservoirs at the rates of 0.3 lpm and 0.56 lpm, respectively, thereby delivering constant amounts of $SiCl_4$ and $POCl_3$ to the bait tube during the entire deposition process. The rate at which oxygen is supplied to the second container increases linearly from 0 to 0.7 lpm so that, during the first pass of the burner along the bait tube, no $GeCl_4$ is supplied to the bait tube, but the amount thereof is linearly increased during the remaining 49 passes of the burner. $BCl_3$ is supplied to the bait tube at the constant rate of 15 sccm, and bypass oxygen is supplied thereto at the rate of 2.4 slm.

After about 3 hours and 20 minutes, the time required for 50 burner passes, the rate of burner movement is decreased to 2.5 cm/min and the temperature increases to about 2200° C. at the outer surface of the bait tube. This causes the collapse of the bait tube into an optical waveguide preform having a solid cross-section. The usable length of this preform is about 84 cm.

The resulting preform or blank is then heated to a temperature at which the materials thereof have a low enough viscosity for drawing (approximately 2000° C.). This structure is then drawn to form about 25 km of optical waveguide filament having an outside diameter of about 110 μm.

I claim:

1. In a method of manufacturing an optical device, said method being of the type that includes the steps of flowing a vapor mixture including at least one compound, glass-forming precursor, together with an oxidizing medium, through a hollow, cylindrical substrate, and heating said substrate and contained vapor mixture with a heat source that moves relative to said substrate in a longitudinal direction, whereby a moving hot zone is established within said substrate, such that a suspension of particulate material is produced, at least a portion of said particulate material traveling downstream where at least a portion thereof comes to rest on the inner surface of said substrate to form a deposit on said inner surface, the improvement which comprises flowing an unconfined stream of gas through the axial region of said substrate in the hot zone thereof so that said stream is the sole mechanism that acts to confine the flow of said vapor mixture to an annular channel adjacent the substrate surface, whereby the deposition efficiency of the reaction of said vapor mixture is increased.

2. The method according to claim 1 wherein the step of flowing comprises introducing into the region of said substrate upstream of said hot zone a tube that is coaxial with said substrate, the output end of said tube terminating just short of said hot zone and moving in synchronism therewith, said stream of gas emanating from that end of said tube adjacent said hot zone.

3. The method according to claim 2 wherein said gas comprises oxygen.

4. The method according to claim 3 further comprising the step of heating said substrate to a temperature sufficiently high to close the aperture therein, thereby forming a draw blank.

5. The method according to claim 4 further comprising the steps of heating said draw blank to the drawing temperature of the materials thereof and drawing said blank to form an optical waveguide filament.

6. In an apparatus for manufacturing from a hollow, cylindrical substrate a preform which is intended to be subsequently drawn into an optical filament, said apparatus being of the type that includes means for supporting said substrate, means for heating an axial section of said substrate, thereby forming a hot zone within said substrate, means for providing relative longitudinal movement between said heating means and said substrate, and means for introducing into one end of said substrate a moving stream of a vapor mixture including at least one compound glass-forming precursor together with an oxidizing medium, said vapor mixture being capable of reacting within said hot zone to form a suspension of particulate material which travels downstream where at least a portion thereof comes to rest on the inner surface of said substrate, the improvement comprising means for flowing an unconfined stream of gas through the axial region of said substrate in the hot zone thereof, the region within said substrate in the hot zone thereof being free from apparatus so that said gas stream is the sole mechanism for confining the flow of said vapor mixture to an annular channel adjacent the substrate wall in the hot zone whereby the reaction of said vapor mixture is confined to an annular region adjacent the substrate wall.

7. An apparatus according to claim 6 wherein said means for flowing comprises a tube disposed in the first end of said cylindrical substrate, an end of said tube terminating adjacent said hot zone, and means for moving said tube longitudinally with respect to said substrate in synchronism with the movement of said heating means, said stream of gas emanating from said end of said tube.

8. An apparatus in accordance with claim 7 wherein said means for flowing a stream of gas comprises means for flowing a stream of oxygen.

9. In the method of manufacturing an optical waveguide preform which includes the steps of passing through a first tube a gas which, when heated, forms glass particles, and moving a heat source along the outside of said first tube whereby at least a portion of said gas is converted to particulate material and at least a portion of said particulate material is deposited on the inside of said first tube, the improvement which comprises moving a second tube within said first tube while maintaining the end of said second tube, which is within said first tube, in spaced relation to said heat source and upstream of said heat source, said second tube having solid side walls and being open at the end thereof which is within said first tube, passing said gas between said first and second tubes, and passing another gas through said second tube, whereby said gas is confined by said another gas to an annular region adjacent the wall of said first tube in the region of said heat source.

10. The method of claim 9 wherein said heat source consolidates said deposited glass particles.

11. The method of claim 9 wherein the flow of said gases is substantially laminar.

12. The method of claim 9 which further comprises the step of collapsing said first tube by heating said first tube after the deposition of said glass particles.

13. The method of claim 9 wherein the downstream end of said second tube is maintained between 25 mm and 75 mm upstream from said heat source.

14. In the method of manufacturing an optical waveguide perform which comprises the steps of passing through a tube a gas which, when heated, forms glass particles, and moving a heat source along the outside of said tube whereby at least a portion of said gas is converted to particulate material and at least a portion of said particulate material is deposited on the inside of said tube, the improvement which comprises positioning a second tube coaxially within said first tube such that a first end of said second tube is within said first tube, said second tube having solid side walls and being open at the end thereof which is within said first tube, reciprocatingly moving said first end of said second tube, passing said gas between said first and second tubes, maintaining said first end of said second tube in axially spaced relation to and upstream of said heat source by a mechanical coupling, and passing a second gas through said second tube, whereby said gas is confined by said second gas to an annular region adjacent the wall of said first tube in the region of said heat source.

15. The method of claim 14 wherein said second gas is selected from the group consisting of oxygen, argon and nitrogen.

16. In an apparatus for manufacturing an optical waveguide preform which apparatus includes means for supporting a first tube, means for heating a portion of said first tube, and means for providing movement between said first tube and said heating means, the improvement which comprises
a second tube, one end of said second tube being disposed within said first tube, said second tube having solid side walls and being open at the end thereof which is within said first tube,
means for moving said one end of said second tube with respect to said first tube, and
means for maintaining a relatively fixed relation between said heating means and said one end of said second tube, said one end of said second tube terminating short of said heating means, no apparatus being situated within said first tube in the region of said heating means, whereby a second gas flowing from said second tube functions to confine a first gas flowing between said first and second tubes to an annular region adjacent the wall of said first tube in the region of said heating means.

17. In a method of the type that includes the steps of
flowing a vapor mixture including at least one reactant gas together with an oxidizing medium, through a hollow, cylindrical substrate, and
heating said substrate and contained vapor mixture with a heat source that moves relative to said substrate in a longitudinal direction, whereby a moving hot zone is established within said substrate, such that a suspension of particulate material is produced, at least a portion of said particulate material traveling downstream where at least a portion thereof comes to rest on the inner surface of said substrate to form continuous deposit on said inner surface,
the improvement which comprises
flowing an unconfined stream of gas through the axial region of said substrate in the hot zone thereof so that said stream is the sole mechanism that acts to confine the flow of said vapor mixture to an annular channel adjacent the substrate surface, whereby the deposition efficiency of the reaction of said vapor mixture is increased.

* * * * *